United States Patent
Briggs et al.

(10) Patent No.: US 7,524,913 B2
(45) Date of Patent: Apr. 28, 2009

(54) FUNCTIONALIZED POLY(4-METHYL-1-PENTENE)

(75) Inventors: John R. Briggs, Charleston, WV (US); Edmund M. Carnahan, Fresno, TX (US); Phillip D. Hustad, Manvel, TX (US); Tia L. Jackson, Nitro, WV (US)

(73) Assignee: Dow Global Technolgies, Inc., Midland, MI (US)

( * ) Notice: Subject to any disclaimer, the term of this patent is extended or adjusted under 35 U.S.C. 154(b) by 0 days.

(21) Appl. No.: 11/632,372

(22) PCT Filed: Jan. 21, 2005

(86) PCT No.: PCT/US2005/001625

§ 371 (c)(1),
(2), (4) Date: Jan. 12, 2007

(87) PCT Pub. No.: WO2006/022806

PCT Pub. Date: Mar. 2, 2006

(65) Prior Publication Data

US 2008/0021172 A1    Jan. 24, 2008

Related U.S. Application Data

(60) Provisional application No. 60/600,002, filed on Aug. 9, 2004, provisional application No. 60/632,099, filed on Dec. 1, 2004.

(51) Int. Cl.
C08F 10/14 (2006.01)
C08F 8/06 (2006.01)
C08F 8/30 (2006.01)
C08F 4/64 (2006.01)

(52) U.S. Cl. ............ 526/348.4; 526/348; 526/161; 526/172; 525/333.7; 525/338; 525/378; 525/379; 525/383

(58) Field of Classification Search ............ 526/348, 526/348.4, 161, 172; 525/333.7, 338, 378, 525/379, 383
See application file for complete search history.

(56) References Cited

U.S. PATENT DOCUMENTS

2004/0097668 A1 *  5/2004  Dall'Occo et al. ........ 526/126

FOREIGN PATENT DOCUMENTS

EP            758657 A2 *   2/1997

* cited by examiner

*Primary Examiner*—Roberto Rábago

(57) ABSTRACT

An olefin polymer having greater than 95 percent chain end unsaturation, where greater than 80 percent of said unsaturation comprises a 1,2-disubstituted olefinic unsaturation, especially polymers comprising in polymerized form 4-methyl-1-pentene and more especially highly isotactic polymers, a process of manufacture, methods to functionalize and articles formed therefrom.

27 Claims, 3 Drawing Sheets

FUNCTIONALIZED POLY(4-METHYL-1-PENTENE)

CROSS REFERENCE STATEMENT

This application claims the benefit of U.S. Provisional Applications Nos. 60/600,002 and 60/632,099 filed Aug. 9, 2004 and Dec. 1, 2004, respectively.

BACKGROUND OF THE INVENTION

This invention relates to polymers of 4-methyl-1-pentene (p-4MP-1) having a high degree of terminal 1,2-disubstituted olefinic unsaturation, methods of making such polymers, derivatives thereof, and compositions and end-uses employing the same.

Polymers, including homopolymers of a single monomer and copolymers synthesized from one or more monomers, containing a high degree of chain terminating 1,2-disubstituted olefinic unsaturation are known to be useful for post-polymerization reactions. Due to the greater reactivity of such ethylenic unsaturation compared to more sterically shielded vinylidene functionality, reactions such as grafting with other ethylenically unsaturated moieties or insertion polymerizations, where the vinyl-terminated polymers are copolymerized with insertion polymerizable monomers, are greatly facilitated. Moreover, certain finishing operations such as painting, laminating, or adhering objects and articles molded, extruded or otherwise formed from such polymers are also benefited. Because the polymers containing 1,2-disubstituted olefinic unsaturation are often used in further polymerization processes, as curing agents or as components of blends, they are often referred to as macromonomers, or simply macromers.

Many useful polymers containing terminal 1,2-disubstituted olefinic unsaturation have been developed in the art and are used in industrial processes in forming articles and blends, in forming further functionalized derivatives, and in the manufacture of branched polymers. Examples of prior art stereospecific propylene macromers are found in U.S. Pat. No. 6,117,962, and elsewhere. Due to the low crystalline melting points of such propylene based macromers, they are limited to use in applications having low service temperatures.

Homopolymers and copolymers of 4-methyl-1-pentene, especially stereospecific, and in particular, isotactic versions thereof, are known to generally possess higher crystalline melting point than corresponding polymers of propylene. Examples of such p-4MP1 compounds as well as blends and compositions incorporating the same are disclosed in U.S. Pat. Nos. 4,342,854; 4,659,792, 5,025,057, 5,182,330, 5,338,792, 5,689,484, 5,922,812, 6,458,890, and elsewhere. The polymers are prepared by the use of known addition polymerization catalysts such as Ziegler-Natta, metallocene and chromium based organometallic catalyst compositions. However, such catalysts, especially metallocenes, disadvantageously require the use of a chain termination agent, such as hydrogen, in order to obtain meaningful quantities of polymeric product.

Unlike polyethylenes, which can be made with high terminal olefinic unsaturation, similarly terminated p-4MP1 compositions, especially those having a high 4-methyl-1-pentene content or a high degree of stereospecificity, are rare or non-existent. While regular β-hydride elimination gives the desired terminal functionality in ethylene, β-alkyl group elimination, a less favored process, is necessary to provide similar functionality in polymers of higher α-olefins. Moreover, use of hydrogen or other chain transfer agent in a polymerization process gives saturated chain terminal groups, thereby completely eliminating formation of terminal 1,2-disubstituted olefinic unsaturation where a chain transfer agent is utilized. Because 4-methyl-1-pentene has not previously been found to be readily polymerizable by metallocene or other stereospecific polymerization catalysts in the absence of such chain terminating agents, formation of p-4MP1 products containing 1,2-disubstituted olefinic unsaturation has been previously unattainable.

In U.S. Pat. Nos. 6,713,557 and 6,750,345 certain pyridyl amine and substituted pyridyl amine complexes of transition metals, especially hafnium, are disclosed for use as olefin polymerization catalysts. Among the suitable olefins said to be usefully polymerized is 4-methyl-1-pentene (see, col. 77, lines 16 and 22, respectively), however, no p-4MP1 products were prepared.

Despite the advance in the art occasioned by the foregoing researchers, there remains a need to develop certain polymeric derivatives of 4-methyl-1-pentene having improved levels of terminal 1,2-disubstituted olefinic unsaturation functionality, to develop functionalized derivatives thereof, as well as to develop methods for forming and utilizing such polymers and functionalized derivatives.

SUMMARY OF THE INVENTION

In one aspect, the present invention relates to a polyolefin having greater than 85 percent chain end unsaturation, where greater than 70 percent of said unsaturation comprising 1,2-disubstituted olefin functionality. In another embodiment of the invention there is provided a composition comprising poly(4-methyl-1-pentene) having enhanced olefin terminal group content. In yet another embodiment, there is provided a polyolefin having Tm greater than 170° C. or a Tg greater than 30° C., and greater than 50 percent of said chains ending in 1,2-disubstituted olefinic unsaturation. In an additional embodiment, there is provided a functionalized derivative formed by reaction of at least some of the terminal olefinic unsaturation of any of the foregoing embodiments of the invention with at least one additional compound that is reactive with said olefinic unsaturation. In still another embodiment of the invention, there is provided a process for preparing the terminal group functionalized compositions disclosed above. In a final embodiment of the invention, there is provided a method of using the foregoing compositions to form fabricated products or articles having improved coating, sealing, laminating, adhering, blending or painting properties, optionally in combination with improved heat resistance properties.

DETAILED DESCRIPTION

Figure 1:
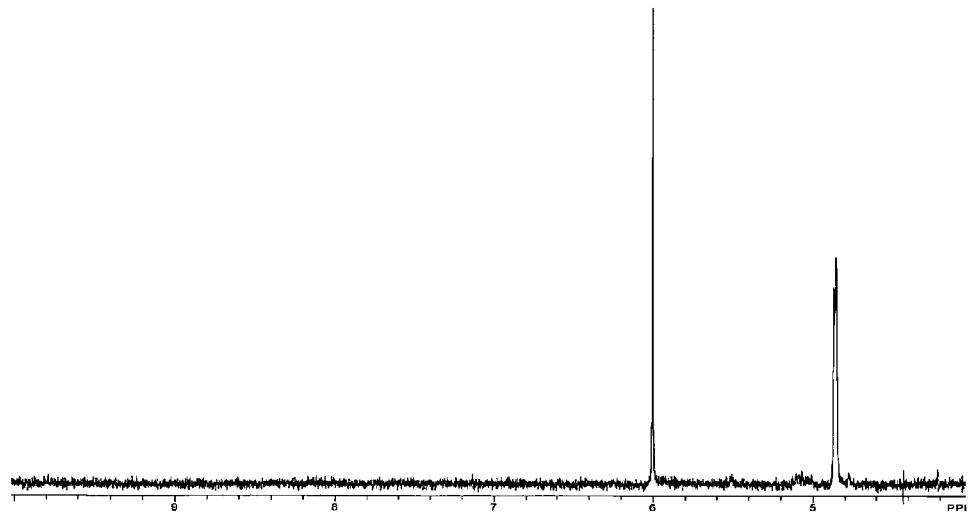
FIG. 1 is the $^1$H NMR spectrum of a comparative p-4MP1 composition substantially lacking in terminal 1,2-disubstituted olefinic unsaturation.

All reference to the Periodic Table of the Elements herein shall refer to the Periodic Table of the Elements, published and copyrighted by CRC Press, Inc., 2003. Also, any reference to a Group or Groups shall be to the Group or Groups as reflected in this Periodic Table of the Elements using the IUPAC system for numbering groups. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, raw materials, and general knowledge in the art. Unless stated to the contrary, implicit from the context, or customary in the art, all parts and percents are based on weight.

If appearing herein, the term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability. The term "consisting of", if used, excludes any component, step or procedure not specifically delineated or listed. The term "or", unless stated otherwise, refers to the listed members individually as well as in any combination.

The present invention involves forming high melting point polymers comprising a relatively high degree of olefin terminal unsaturation which can be used for a variety of purposes, such as certain finishing operations including painting, laminating, or adhering films to objects and articles molded, extruded or otherwise formed from such polymers. Because the olefin-terminated polymers are often used in further polymerization processes, as curing agents or as components of blends, they are often referred to as macromonomers, or simply macromers. In addition, the olefinic end groups in the polymers of the invention provide a reactive site to allow for subsequent chemical modification of the polymers. Examples include the introduction of chain end alcohol, amine, or carboxylic acid functionalities. Suitable products include both low molecular weight or oligomeric products as well as high molecular weight polymers. Homopolymers, where the sole monomer employed is 4-methyl-1-pentene, and copolymers, including block copolymers where one or more addition polymerizable monomers are copolymerized with 4-methyl-1-pentene are included. A particularly preferred comonomer is ethylidene norbornene. The polymers of the invention are preferably highly stereospecific, primarily isotactic, and have a high percentage of end groups containing 1,2-disubstituted olefinic unsaturation. By the term "terminal unsaturation" is meant that the olefin group occurs within 5 carbons from the end of a polymer chain.

The polymers of the present invention are the polymeric or oligomeric products resulting from the coordination polymerization of high melting point polymer forming monomers, such as 4-methyl-1-pentene, nonbornene, and cyclic olefins, alone or in combination with one or more olefin or diolefin containing monomers. High proportions of terminal 1,2-disubstituted olefinically unsaturated chains relative to the total number of chains in the polymerization reaction products are readily achieved. More desirably, the percentage of terminal olefinic unsaturation is greater than 90 percent, preferably greater than 95 percent of the chain ends. Additionally, greater than 75 percent, preferably greater than 80 percent of said terminal unsaturation is in the form of 1,2-disubstituted olefinic unsaturation rather than a vinylidene group. Highly desirably, in the polymers according to the invention comprising 4-methyl-1-pentene in polymerized form 90 percent, more preferably 95 percent of the terminal groups comprise 1,2-disubstituted olefinic unsaturation. Accordingly, these polymers are highly effective when used in subsequent reactions where reactive vinyl groups are desired.

The percentage of terminally unsaturated stereospecific polymer chains, especially isotactic chains, in the product of the present invention may be as high as 75 percent, 90 percent, or even 95 percent. As used herein, "isotactic" is defined as polymer repeat units having at least 70 percent isotactic pentads as determined by $^{13}$C-NMR analysis. "Highly isotactic" is defined as polymers having at least 90 percent isotactic pentads. Preferably, the polymers of the present invention are highly isotactic.

The number-average molecular weight (Mn) of the polymers of the present invention typically ranges from greater than or equal to 2,000 Daltons to less than 200,000 Daltons, preferably less than 100,000 Daltons, more preferably less than 80,000 Daltons, most preferably less than or equal to 50,000 Daltons. Preferably, the Mn of the polymers of the present invention is greater than or equal to 5,000 Daltons, more preferably greater than or equal to 7,500 Daltons, most preferably greater than or equal to 9,000 Daltons.

The olefin polymers of the invention, especially those consisting essentially of 4-methyl-1-pentene or copolymers of 4-methyl-1-pentene with $C_{3-20}$ olefins, are desirably highly isotactic.

Preferably, polymers according to the present invention have Tm of greater than 190° C., more preferably greater than 220° C. In addition, such polymers preferably have Tg greater than 35° C., preferably greater then 40° C. Certain high melting point copolymers according to the invention have Tg greater than 150° C. and even greater than 200° C.

The method for preparing the polymers of the present invention involves contacting the monomer alone or in combination with other addition polymerizable monomers, with a catalyst composition comprising a transition metal complex of a polyvalent Lewis base, under addition polymerization conditions. Preferred complexes are Group 4 metal complexes, preferably zirconium or hafnium complexes.

Examples of polyvalent Lewis base metal complexes that are usefully employed herein include compounds corresponding to the formula:

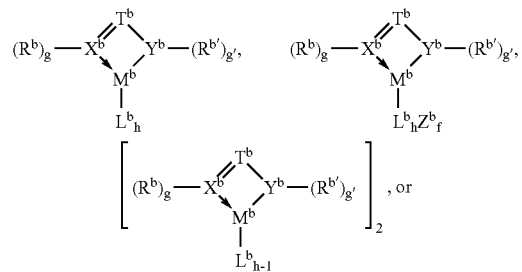

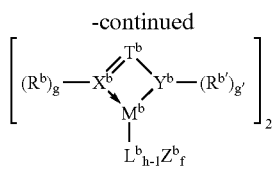

wherein $T^b$ is a bridging group containing 2 or more atoms other than hydrogen.

$X^b$ and $Y^b$ are each independently selected from the group consisting of nitrogen, sulfur, oxygen and phosphorus; more preferably both $X^b$ and $Y^b$ are nitrogen.

$R^b$ and $R^{b'}$ independently each occurrence are $C_{1-50}$ hydrocarbyl groups optionally containing one or more heteroatoms or inertly substituted derivative thereof. Non-limiting examples of suitable $R^b$ and $R^{b'}$ groups include alkyl, alkenyl, aryl, aralkyl, (poly)alkylaryl and cycloalkyl groups, as well as nitrogen, phosphorus, oxygen and halogen substituted derivatives thereof.

Specific examples of suitable Rb and Rb' groups include methyl, ethyl, isopropyl, octyl, phenyl, 2,6-dimethylphenyl, 2,6-di(isopropyl)phenyl, 2,4,6-trimethylphenyl and benzyl.

g Is 0 or 1.

$M^b$ is a metallic element selected from Groups 3 to 15, or the Lanthanide series of the Periodic Table of the Elements. Preferably, $M^b$ is a Group 3-13 metal, more preferably $M^b$ is a Group 4-8 metal.

$L^b$ is a monovalent, divalent, or trivalent anionic ligand containing from 1 to 50 atoms, not counting hydrogen. Examples of suitable $L^b$ groups include halide; hydride; hydrocarbyl, hydrocarbyloxy; di(hydrocarbyl)amido, hydrocarbyleneamido, di(hydrocarbyl)phosphido; hydrocarbylsulfido; hydrocarbyloxy, tri(hydrocarbylsilyl)alkyl; and carboxylates. More preferred $L^b$ groups are $C_{1-20}$ alkyl, $C_{7-20}$ aralkyl, and chloride.

h Is an integer from 1 to 6, preferably from 1 to 4, more preferably from 1 to 3.

$Z^b$ is a neutral ligand group coordinated to $M^b$, and containing up to 50 atoms not counting hydrogen Preferred $Z^b$ groups include aliphatic and aromatic amines, phosphines, and ethers, alkenes, alkadienes, and inertly substituted derivatives thereof. Suitable inert substituents include halogen, alkoxy, aryloxy, alkoxycarbonyl, aryloxycarbonyl, di(hydrocarbyl)amine, tri(hydrocarbyl)silyl, and nitrile groups. Preferred $Z^b$ groups include triphenylphosphine, tetrahydrofuran, pyridine, and 1,4-diphenylbutadiene.

f Is an integer from 1 to 3.

Additionally, two or three of $T^b$, $R^b$ and $R^{b'}$ may be joined together to form a single or multiple ring structure, and arrows signify coordinate bonds.

In one embodiment, it is preferred that $R^b$ have relatively low steric hindrance with respect to $X^b$. In this embodiment, most preferred $R^b$ groups are straight chain alkyl groups, straight chain alkenyl groups, branched chain alkyl groups wherein the closest branching point is at least 3 atoms removed from $X^b$, and halo, dihydrocarbylamino, alkoxy or trihydrocarbylsilyl substituted derivatives thereof. Highly preferred $R^b$ groups in this embodiment are $C_{1-8}$ straight chain alkyl groups.

At the same time, in this embodiment $R^{b'}$ preferably has relatively high steric hindrance with respect to $Y^b$. Non-limiting examples of suitable $R^{b'}$ groups for this embodiment include alkyl or alkenyl groups containing one or more secondary or tertiary carbon centers, cycloalkyl, aryl, alkaryl, aliphatic or aromatic heterocyclic groups, organic or inorganic oligomeric, polymeric or cyclic groups, and halo, dihydrocarbylamino, alkoxy or trihydrocarbylsilyl substituted derivatives thereof. Preferred $R^{b'}$ groups in this embodiment contain from 3 to 40, more preferably from 3 to 30, and most preferably from 4 to 20 atoms not counting hydrogen and are branched or cyclic.

Examples of preferred $T^b$ groups are structures corresponding to the following formulas:

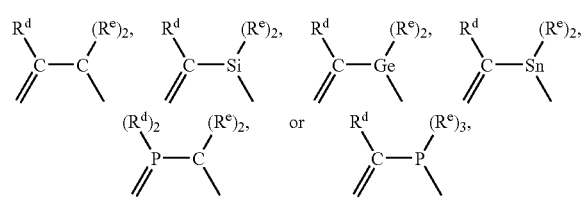

wherein $R^d$ is $C_{1-10}$ hydrocarbyl or two $R^d$ groups together form a hydrocarbylene group, preferably each $R^d$ is methyl, ethyl, n-propyl, i-propyl, t-butyl, phenyl, 2,6-dimethylphenyl, benzyl, or tolyl.

Each $R^e$ is $C_{1-10}$ hydrocarbyl or two $R^e$ groups together form a hydrocarbylene group. Preferably each $R^e$ is methyl, ethyl, n-propyl, i-propyl, t-butyl, phenyl, 2,6-dimethylphenyl, benzyl, or tolyl, or two $R^e$ groups together are 1,4-butylene or 1,5-pentylene.

Preferred polyvalent Lewis base compounds include hydrocarbylamine substituted heteroaryl compounds and bisphenolphenoxyethers, especially compounds of the formula $R^1$ HN-T-$R^2$ and $(HOR^1O)_2T$, where, $R^1$ is hydrocarbyl or inertly substituted hydrocarbyl containing from 1 to 30 atoms not counting hydrogen, or a polyvalent derivative thereof;

T is a divalent bridging group of from 1 to 20 atoms other than hydrogen; and $R^2$ is a hydrocarbyl or inertly substituted hydrocarbyl group containing from 1 to 30 atoms not counting hydrogen, or a polyvalent derivative thereof, said $R^2$ group comprising at least one Lewis base functional group.

Preferred metal complexes of polyvalent Lewis bases for use herein include the corresponding compounds of the formulas:

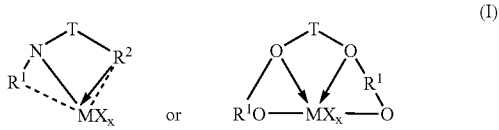

(I)

where, $R^1$ is an aromatic or inertly substituted aromatic group containing from 5 to 20 atoms not counting hydrogen, or a polyvalent derivative thereof;

$R^2$ is a $C_{5-20}$ heteroaryl group containing Lewis base functionality, especially a pyridin-2-yl- or substituted pyridin-2-yl group;

T is a $C_{1-20}$(hydrocarbylene or silane group or an inertly substituted derivative thereof;

M is a Group 4 metal, preferably hafnium;

X is an anionic, neutral or dianionic ligand group; preferably a halide, hydrocarbyl or dihydrocarbylamide group having up to 20 atoms not counting hydrogen;

x is a number from 1 to 5 indicating the number of such X groups; and bonds, optional bonds and electron donative interactions are represented by lines, dotted lines and arrows respectively.

More preferred complexes of formula (I) are those wherein ligand formation results from hydrogen elimination from the amine group and optionally from the loss of one or more additional groups, especially from $R^2$. In addition, electron donation from the Lewis base functionality, preferably an electron pair, provides additional stability to the metal center. Preferred examples of the foregoing metal complexes of polyfunctional Lewis base compounds of formula (I) corresponding to the formula:

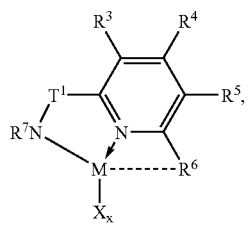

wherein

M, X, and x are as previously defined, $T^1$ is methylene, ethylene, silane or a $C_{1-10}$ hydrocarbyl substituted derivative thereof, $R^3$, $R^4$, $R^5$ and $R^6$ are hydrogen, halo, or an alkyl, cycloalkyl, heteroalkyl, heterocycloalkyl, aryl, or silyl group of up to 20 atoms not counting hydrogen, or adjacent $R^3$, $R^4$, $R^5$ or $R^6$ groups may be joined together thereby forming fused ring derivatives, $R^7$ is $C_{1-20}$ hydrocarbyl or inertly substituted hydrocarbyl; and bonds, optional bonds and electron pair donative interactions are represented by lines, dotted lines and arrows respectively.

More preferred examples of the foregoing metal complexes of formula (I) correspond to the formula:

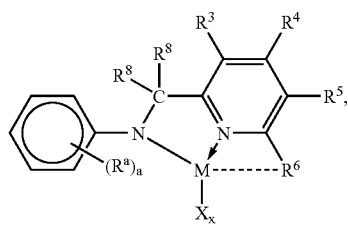

wherein

M, X, and x are as previously defined, $R^3$, $R^4$, and $R^5$ are hydrogen, $C_{1-4}$ alkyl, fluoro, or two or more such groups together form a fused ring system, $R^6$ is $C_{6-20}$ aryl or arylene, most preferably phenyl, phenylene, naphthyl, or naphthylene;

$R^a$ independently each occurrence is $C_{1-4}$ alkyl, and a is 1-5, most preferably $R^a$ in two ortho-positions, to the nitrogen is isopropyl or t-butyl;

$R^8$ independently each occurrence is hydrogen, halogen, or a $C_{1-20}$ alkyl or aryl group, most preferably one $R^8$ is hydrogen and the other is a $C_{6-20}$ aryl group, especially an alkyl-substituted phenyl group or a fused polycyclic aryl group, most preferably a naphthyl or anthracenyl group, and bonds, optional bonds and electron pair donative interactions are represented by lines, dotted lines and arrows respectively.

Highly preferred polyfunctional Lewis base complexes of formula (I) for use herein correspond to the formula:

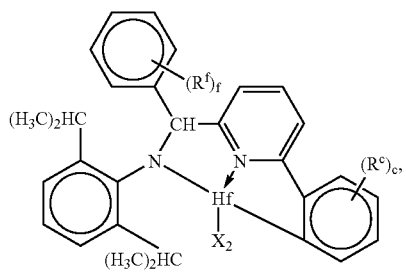

wherein

X each occurrence is halide, N,N-dimethylamido, or $C_{1-4}$ alkyl;

$R^f$ independently each occurrence is hydrogen, halogen, $C_{1-20}$ alkyl, $C_{3-20}$ cycloalkyl, $C_{6-20}$ aryl, $C_{7-20}$ aralkyl, or two adjacent $R^f$ groups are joined together thereby forming a ring, and f is 1-5; and $R^c$ independently each occurrence is hydrogen, halogen, $C_{1-20}$ alkyl, or $C_{6-20}$ aryl, or two adjacent $R^c$ groups are joined together thereby forming a ring, and c is 1-5.

Most highly preferred metal complexes of formula (I) correspond to the formula:

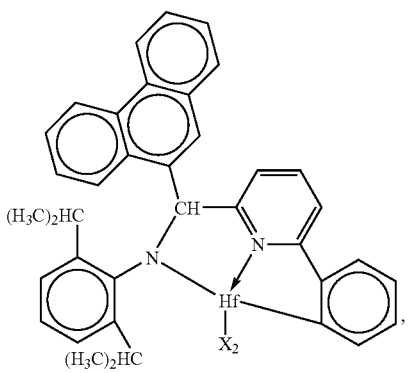

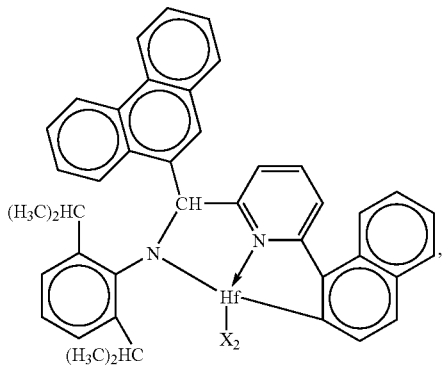

-continued

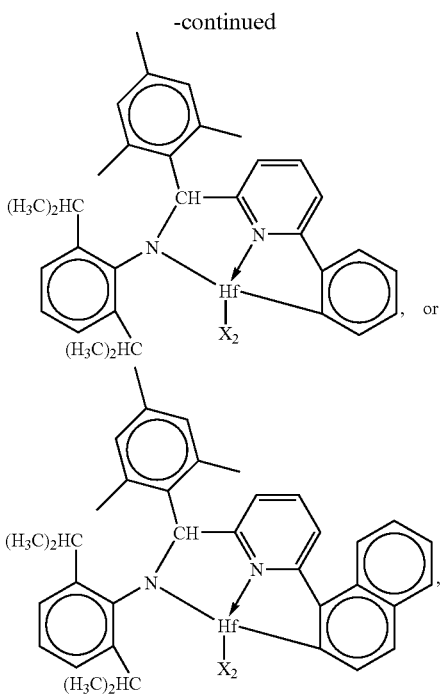, or wherein X each occurrence is halide, N,N-dimethylamido, or $C_{1-4}$ alkyl, preferably methyl.

Examples of metal complexes of formula (I) for use according to the present invention include:

[N-(2,6-di(1-methylethyl)phenyl)amido)(o-tolyl)(phenylen-2-diyl)(6-pyridin-2-diyl)methane)]hafnium dimethyl;

[N-(2,6-di(1-methylethyl)phenyl)amnido)(o-tolyl)(phenylen-2-diyl)(6-pyridin-2-diyl)methane)]hafnium di(N,N-dimethylamido);

[N-(2,6-di(1-methylethyl)phenyl)amido)(o-tolyl)(phenylen-2-diyl)(6-pyridin-2-diyl)methane)]hafnium dichloride;

[N-(2,6-di(1-methylethyl)phenyl)amido)(2,4,6-trimethylphenyl)(phenylen-2-diyl)(6-pyridin-2-diyl)methane)] hafnium dimethyl;

[N-(2,6-di(1-methylethyl)phenyl)amido)(2,4,6-trimethylphenyl)(phenylen-2-diyl)(6-pyridin-2-diyl)methane)] hafnium di(N,N-dimethylamido);

[N-(2,6-di(1-methylethyl)phenyl)amido)(2,4,6-trimethylphenyl)(phenylen-2-diyl)(6-pyridin-2-diyl)methane)] hafnium dichloride;

[N-(2,6-di(1-methylethyl)phenyl)amido)(2-isopropylphenyl)(phenylen-2-diyl)(6-pyridin-2-diyl)methane)]hafnium dimethyl;

[N-(2,6-di(1-methylethyl)phenyl)amido)(2-isopropylphenyl)(phenylen-2-diyl)(6-pyridin-2-diyl)methane)]hafnium di(N,N-dimethylamido);

[N-(2,6-di(1-methylethyl)phenyl)amido)(2-isopropylphenyl)(phenylen-2-diyl)(6-pyridin-2-diyl)methane)]hafnium dichloride;

[N-(2,6-di(1-methylethyl)phenyl)amido)(phenanthren-5-yl)(phenylen-2-diyl)(6-pyridin-2-diyl)methane)]hafnium dimethyl;

[N-(2,6-di(1-methylethyl)phenyl)amido)(phenanthren-5-yl)(phenylen-2-diyl)(6-pyridin-2-diyl)methane)]hafnium di(N,N-dimethylamido);

[N-(2,6-di(1-methylethyl)phenyl)amido)(phenanthren-5-yl)(phenylen-2-diyl)(6-pyridin-2-diyl)methane)]hafnium dichloride;

[N-(2,6-di(1-methylethyl)phenyl)amido)(o-tolyl)(α-naphthalen-2-diyl)(6-pyridin-2-diyl)methane)]hafnium dimethyl;

[N-(2,6-di(1-methylethyl)phenyl)amido)(o-tolyl)(α-naphthalen-2-diyl)(6-pyridin-2-diyl)methane)]hafnium di(N,N-dimethylamido);

[N-(2,6-di(1-methylethyl)phenyl)amido)(o-tolyl)(α-naphthalen-2-diyl)(6-pyridin-2-diyl)methane)]hafnium dichloride;

[N-(2,6-di(1-methylethyl)phenyl)amido)(2,4,6-trimethylphenyl)(α-naphthalen-2-diyl)(6-pyridin-2-diyl)methane)] hafnium dimethyl;

[N-(2,6-di(1-methylethyl)phenyl)amido)(2,4,6-trimethylphenyl)(α-naphthalen-2-diyl)(6-pyridin-2-diyl)methane)] hafnium di(N,N-dimethylamido);

[N-(2,6-di(1-methylethyl)phenyl)amido)(2,4,6-trimethylphenyl)(α-naphthalen-2-diyl)(6-pyridin-2-diyl)methane)] hafnium dichloride;

[N-(2,6-di(1-methylethyl)phenyl)amido)(2-isopropylphenyl)(α-naphthalen-2-diyl)(6-pyridin-2-diyl)methane)] hafnium dimethyl;

[N-(2,6-di(1-methylethyl)phenyl)amido)(2-isopropylphenyl)(α-naphthalen-2-diyl)(6-pyridin-2-diyl)methane)] hafnium di(N,N-dimethylamido);

[N-(2,6-di(1-methylethyl)phenyl)amido)(2-isopropylphenyl)(α-naphthalen-2-diyl)(6-pyridin-2-diyl)methane)] hafnium dichloride;

[N-(2,6-di(1-methylethyl)phenyl)amido)(phenanthren-5-yl)(α-naphthalen-2-diyl)(6-pyridin-2-diyl)methane)] hafnium dimethyl;

[N-(2,6-di(1-methylethyl)phenyl)amido)(phenanthren-5-yl)(α-naphthalen-2-diyl)(6-pyridin-2-diyl)methane)] hafnium di(N,N-dimethylamido); and

[N-(2,6-di(1-methylethyl)phenyl)amido)(phenanthren-5-yl)(α-naphthalen-2-diyl)(6-pyridin-2-diyl)methane)] hafnium dichloride.

Under the reaction conditions used to prepare the metal complexes of formula (I), it has been discovered that the hydrogen of the 2-position of the α-naphthalene group substituted at the 6-position of the pyridin-2-yl group is subject to elimination, thereby uniquely forming metal complexes wherein the metal is covalently bonded to both the resulting amide group and to the 2-position of the α-naphthalenyl group, as well as stabilized by coordination to the pyridinyl nitrogen atom through the electron pair of the nitrogen atom.

Metal complexes of formula (II) especially include Group 4 metal complexes of hydroxyaryl substituted bis(aryloxy) ligands of the formula: $(HOAr^1O)_2T^2$; wherein:

$T^2$ is a divalent bridging group of from 2 to 20 atoms not counting hydrogen; and $Ar^1$ independently each occurrence is a $C_{6-20}$ arylene or inertly substituted arylene group.

Preferably, such complexes correspond to the formula:

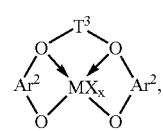

wherein:

$T^3$ is a divalent bridging group of from 2 to 20 atoms not counting hydrogen, preferably a substituted or unsubstituted, $C_{3-6}$ alkylene group; and $Ar^2$ independently each occurrence is an arylene or an alkyl-or aryl-substituted arylene group of from 6 to 20 atoms not counting hydrogen;

M is a Group 4 metal, preferably hafnium;

X independently each occurrence is an anionic, neutral or dianionic ligand group;

x is a number from 1 to 5 indicating the number of such X groups; and bonds and electron donative interactions are represented by lines and arrows respectively.

Preferred examples of metal complexes of formula (II) correspond to the formula:

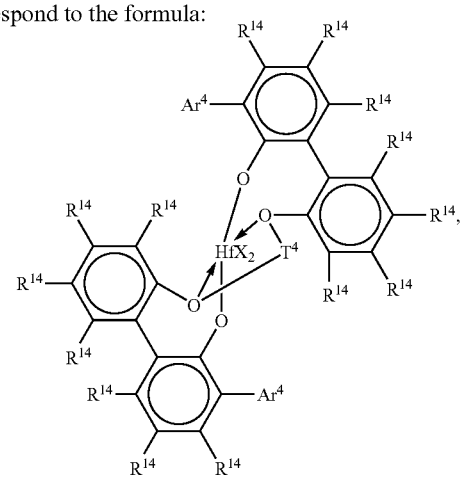

where $Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and $T^4$ independently each occurrence is $C_{3-6}$ alkylene or an inertly substituted derivative thereof;

$R^{14}$ independently each occurrence is hydrogen, halo, hydrocarbyl, trihydrocarbylsilyl, or trihydrocarbylsilylhydrocarbyl of up to 50 atoms not counting hydrogen; and X, independently each occurrence is halo or a hydrocarbyl or trihydrocarbylsilyl group of up to 20 atoms not counting hydrogen, or 2 X groups together are a divalent derivative of the foregoing hydrocarbyl or trihydrocarbylsilyl groups.

Especially preferred are compounds of the formula:

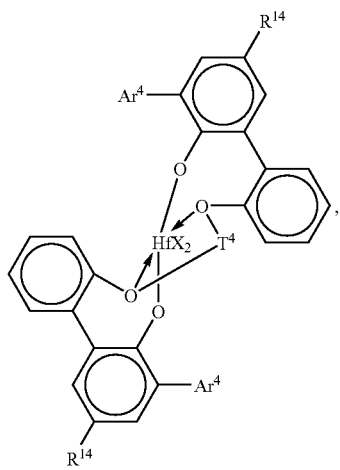

wherein $Ar^4$ is 3,5-di(isopropyl)phenyl, 3,5-di(isobutyl)phenyl, dibenzo-1H-pyrrole-1-yl, or anthracen-5-yl, $R^{14}$ is hydrogen, halo, or $C_{1-4}$ alkyl, especially methyl $T^4$ is propan-1,3-diyl or butan-1,4-diyl, and X is chloro, methyl or benzyl.

A most highly preferred metal complex of formula (II) corresponds to the formula:

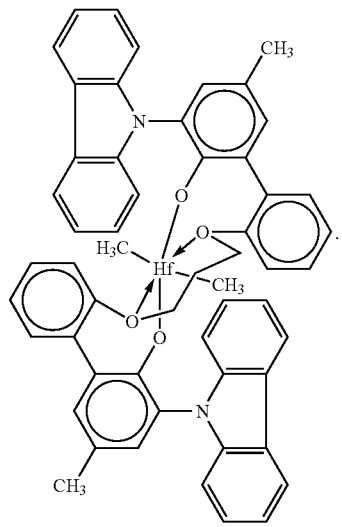

The foregoing polyvalent Lewis base complexes are conveniently prepared by standard metallation and ligand exchange procedures involving a source of the Group 4 metal and the neutral polyfunctional ligand source. In addition, the complexes of formula (I) may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, WO 02/38628, WO 03/40195, and U.S. Ser. No. 10/429024, filed May 2, 2003 now U.S. Pat. No. 6,953,764.

The metal complexes are rendered catalytically active by combination with a cocatalyst, preferably a cation forming cocatalyst, such as those previously known in the art for use with transition metal olefin polymerization complexes. Suitable cation forming cocatalysts for use herein include neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluorophenyl)boron; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, or ferrocenium-, lead- or silver salts of compatible, noncoordinating anions; polymeric or oligomeric linear or cyclic organoaluminumoxy compounds, especially alumoxanes; and combinations of the foregoing cocatalysts and techniques. The foregoing activating cocatalysts and activating techniques have been previously taught with respect to different metal complexes for olefin polymerizations in the following references: EP-A-

277,003, U.S. Pat. Nos. 5,153,157, 5,064,802, 5,321,106, 5,721,185, 5,350,723, 5,425,872, 5,625,087, 5,883,204, 5,919,983, 5,783,512, WO 99/15534, and WO99/42467.

Combinations of neutral Lewis acids, especially the combination of a trialkyl aluminum compound having from 1 to 4 carbons in each alkyl group and a halogenated tri(hydrocarbyl)-boron compound having from 1 to 20 carbons in each hydrocarbyl group, especially tris(pentafluorophenyl)boron, further combinations of such neutral Lewis acid mixtures with a polymeric or oligomeric alumoxane, and combinations of a single neutral Lewis acid, especially tris(pentafluorophenyl)boron with a polymeric or oligomeric alumoxane may be used as activating cocatalysts. Preferred molar ratios of metal complex:tris(pentafluorophenylboron:alumoxane are from 1:1:1 to 1:5:20, more preferably from 1:1:1.5 to 1:5:10.

Suitable cation forming compounds useful as cocatalysts in one embodiment of the present invention comprise a cation which is a Bronsted acid capable of donating a proton, and a compatible, noncoordinating anion, $A^-$. As used herein, the term "noncoordinating" means an anion or substance which either does not coordinate to the transition metal containing precursor complex and the catalytic derivative derived therefrom, or which is only weakly coordinated to such complexes thereby remaining sufficiently labile to be displaced by a neutral Lewis base. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are non interfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

$(L^*-H)_g^+(A)^{g-}$, wherein:

L* is a neutral Lewis base;
$(L^*-H)+$ is a conjugate Bronsted acid of L*;
$A^{g-}$ is a noncoordinating, compatible anion having a charge of g-, and
g is an integer from 1 to 3.
More preferably $A^{g-}$ corresponds to the formula: $[M'Q_4]^-$; wherein:
M' is boron or aluminum in the +3 formal oxidation state; and
Q independently each occurrence is selected from hydride, dialkylamido, halide, hydrocarbyl, hydrocarbyloxide, halosubstituted-hydrocarbyl, halosubstituted hydrocarbyloxy, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is A-. Activating cocatalysts comprising boron which are particularly useful in the preparation of catalysts of this invention may be represented by the following general formula:

$(L^*-H)^+(BQ_4)^-$; wherein:

L* is as previously defined;
B is boron in a formal oxidation state of 3; and
Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Preferred Lewis base salts are ammonium salts, more preferably trialkylammonium salts containing one or more $C_{12-40}$ alkyl groups. Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are tri-substituted ammonium salts such as:

trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxytris(pentafluorophenyl)borate, N,N-diethylanilinium tetrakis(pentafluorophenyl)borate, N,N-dimethyl-2,4,6-trimethylanilinium tetrakis(pentafluorophenyl) borate, dimethyloctadecylammonium tetrakis (pentafluorophenyl)borate, methyldioctadecylammonium tetrakis(pentafluorophenyl)borate, dialkyl ammonium salts such as:

di-(i-propyl)ammonium tetrakis(pentafluorophenyl)borate, methyloctadecylammonium tetrakis(pentafluorophenyl)borate, methyloctadodecylammonium tetrakis(pentafluorophenyl)borate, and dioctadecylammonium tetrakis (pentafluorophenyl)borate;

tri-substituted phosphonium salts such as:

triphenylphosphonium tetrakis(pentafluorophenyl)borate, methyldioctadecylphosphonium tetrakis(pentafluorophenyl) borate, and tri(2,6-dimethylphenyl)phosphonium tetrakis (pentafluorophenyl)borate;

di-substituted oxonium salts such as:

diphenyloxonium tetrakis(pentafluorophenyl)borate, di(o-tolyl)oxonium tetrakis(pentafluorophenyl)borate, and di(octadecyl)oxonium tetrakis(pentafluorophenyl)borate;

di-substituted sulfonium salts such as:

di(o-tolyl)sulfonium tetrakis(pentafluorophenyl)borate, and methylcotadecylsulfonium tetrakis(pentafluorophenyl) borate.

Preferred $(L^*-H)^+$ cations are methyldioctadecylammonium cations, dimethyloctadecylammonium cations, and ammonium cations derived from mixtures of trialkyl amines containing one or 2 $C_{14-18}$ alkyl groups.

Another suitable ion forming, activating cocatalyst comprises a salt of a cationic oxidizing agent and a noncoordinating, compatible anion represented by the formula:

$(Ox^{h+})_g(A^{g-})_h$, wherein:

$Ox^{h+}$ is a cationic oxidizing agent having a charge of h+;

h is an integer from 1 to 3; and $A^{g-}$ and g are as previously defined.

Examples of cationic oxidizing agents include: ferrocenium, hydrocarbyl-substituted ferrocenium, $Ag^+$, or $Pb^{+2}$. Preferred embodiments are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula:

$[C]^+A^-$, wherein:

$[C]^+$ is a $C_{1-20}$ carbenium ion; and $A^-$ is a noncoordinating, compatible anion having a charge of −1. A preferred carbenium ion is the trityl cation, that is triphenylmethylium.

A further suitable ion forming, activating cocatalyst comprises a compound which is a salt of a silylium ion and a noncoordinatinig, compatible anion represented by the formula:

$(Q^1{}_3Si)^+A^-$, wherein:

$Q^1$ is $C_{1-10}$ hydrocarbyl, and $A^-$ is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem Soc. Chem. Comm.*, 1993, 383-384, as well as Lambert, J. B., et al., *Organometallics*, 1994, 13, 2430-2443. The use of the above silylium salts as activating cocatalysts for addition polymerization catalysts is disclosed in U.S. Pat. No. 5,625,087.

Certain complexes of alcohols, mercaptans, silanols, and oximes with tris(pentafluropheniyl)boron are also effective catalyst activators and may be used according to the present invention. Such cocatalysts are disclosed in U.S. Pat. No. 5,296,433.

Suitable activating cocatalysts for use herein also include polymeric or oligomeric alumoxanes, especially methylalumoxane (MAO), triisobutylaluminum modified methylalumoxane (MMAO), or isobutylalumoxane; and Lewis acid modified alumoxanes, especially perhalogenated tri(hydrocarbyl)aluminum- or perhalogenated tri(hydrocarbyl)boron modified alumoxanes, having from 1 to 10 carbons in each hydrocarbyl or halogenated hydrocarbyl group, and most especially tris(pentafluorophenyl)boron modified alumoxanes. Such cocatalysts are previously disclosed in U.S. Pat. Nos. 6,214,760, 6,160,146, 6,140,521, and 6,696,379.

A class of cocatalysts comprising non-coordinating anions generically referred to as expanded anions, further disclosed in U.S. Pat. No. 6,395,671, may be suitably employed to activate the metal complexes for use in the present invention. Generally, these cocatalysts (illustrated by those having imidazolide, substituted imidazolide, imidazolinide, substituted imidazolinide, benzimidazolide, or substituted benzimidazolide anions) may be depicted as follows:

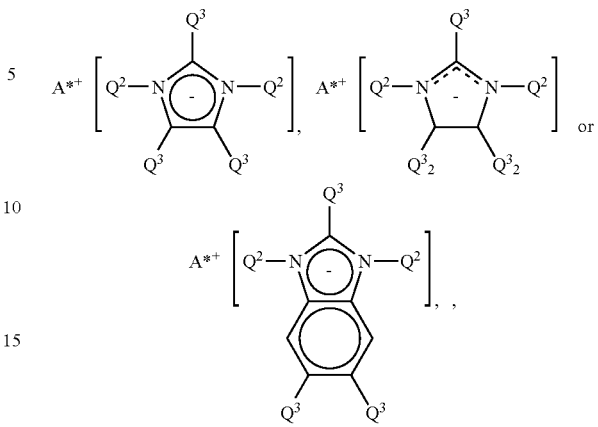

wherein:

$A^{*+}$ is a cation, especially a proton containing cation, and preferably is a trihydrocarbyl ammonium cation containing one or two $C_{10-40}$ alkyl groups, especially a methyldi($C_{14-20}$ alkyl)-ammonium cation, $Q^3$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably $C_{1-20}$ alkyl, and $Q^2$ is tris(pentafluorophenyl)borane or tris(pentafluorophenyl)alumane).

Examples of these catalyst activators include trihydrocarbylammonium-salts, especially methyldi($C_{14-20}$ alkyl)ammonium-salts of:

bis(tris(pentafluorophenyl)borane)imidazolide,
bis(tris(pentafluorophenyl)borane)-2-undecylimidazolide,
bis(tris(pentafluorophenyl)borane)-2-heptadecylimidazolide,
bis(tris(pentafluorophenyl)borane)-4,5-bis(undecyl)imidazolide,
bis(tris(pentafluorophenyl)borane)-4,5-bis(heptadecyl)imidazolide,
bis(tris(pentafluorophenyl)borane)imidazolinide,
bis(tris(pentafluorophenyl)borane)-2-undecylimidazolinide,
bis(tris(pentafluorophenyl)borane)-2-heptadecylimidazolinide,
bis(tris(pentafluorophenyl)borane)-4,5-bis(undecyl)imidazolinide,
bis(tris(pentafluorophenyl)borane)-4,5-bis(heptadecyl)imidazolinide,
bis(tris(pentafluorophenyl)borane)-5,6-dimethylbenzimidazolide,
bis(tris(pentafluorophenyl)borane)-5,6-bis(undecyl)benzimidazolide,
bis(tris(pentafluorophenyl)alumane)imidazolide,
bis(tris(pentafluorophenyl)alumane)-2-undecylimidazolide,
bis(tris(pentafluorophenyl)alumane)-2-heptadecylimidazolide,
bis(tris(pentafluorophenyl)alumane)-4,5-bis(undecyl)imidazolide,
bis(tris(pentafluorophenyl)alumane)-4,5-bis(heptadecyl) imidazolide,
bis(tris(pentafluorophenyl)alumane)imidazolinide,
bis(tris(pentafluorophenyl)alumane)-2-undecylimidazolinide, bis(tris(pentafluorophenyl)alumane)-2-heptadecylimidazolinide,
bis(tris(pentafluorophenyl)alumane)-4,5-bis(undecyl)imidazolinide,
bis(tris(pentafluorophenyl)alumane)-4,5-bis(heptadecyl) imidazolinide,
bis(tris(pentafluorophenyl)alumane)-5,6-dimethylbenzimidazolide, and
bis(tris(pentafluorophenyl)alumane)-5,6-bis(undecyl)benzimidazolide.

Other activators include those described in PCT publication WO 98/075 5 such as tris(2,2', 2"-nonafluorobiphenyl) fluoroaluminate. Combinations of activators are also contemplated by the invention, for example, alumoxanes and ionizing activators in combinations, see for example, EP-A-0 573120, PCT publications WO 94/07928 and WO 95/14044, and U.S. Pat. Nos. 5,153,157 and 5,453,410. WO 98/09996 describes activating compounds that are perchlorates, periodates and iodates, including their hydrates. WO 99/18135 describes the use of organoboroaluminum activators. WO 03/10171 discloses catalyst activators that are adducts of Bronsted acids with Lewis acids. Other activators or methods for activating a catalyst compound are described in for example, U.S. Pat. Nos. 5,849,852, 5,859,653, 5,869,723, EP-A-615981, and PCT publication WO 98/32775. All of the foregoing catalyst activators as well as any other know activator for transition metal complexes may be employed alone or in combination according to the present invention.

A polymerization modifier (PM) composition may also be employed if desired to modify one or more process or product properties. Suitable PM compositions for use in the present invention in the most general sense comprise the reaction product of at least two reagents, such as one or more Lewis acids with one or more organic protonating reagents. It should be appreciated by one of skill in the art that the resulting product may contain a mixture of species, including equilibria between various species and dynamic, interconverting compounds. In one embodiment of the invention, the reaction mixture formed upon combining the foregoing reagents in a suitable diluent, preferably a hydrocarbon such as hexane or heptane, is preferred for use, rather than the purified and/or isolated reaction product itself.

Suitable Lewis acids are compounds of the formula: $[M^4 A^1_x G_{y'}]_{z'}$, wherein:

$M^4$ is a metal of Groups 2-13, Ge, Sn, or Bi;
$A^1$ is independently an anionic or polyanionic ligand;
x' is a number greater than zero and less than or equal to 6;
G is a neutral Lewis base, optionally bound to $A^1$;
y' is a number from 0-4; and
z' is a number from 1 to 10.

Preferably, the Lewis acids are compounds of the general formula: $M^4 A^1_x G_{y'}$, wherein, $M^4$ is a metal of Groups 2-13, Ge, Sn, or Bi;
$A^1$ is independently an anionic ligand;
x' is an integer and is equal to the valence of $M^4$;
G is a neutral Lewis base; and
y' is a number from 0-4.

More preferably, $M^4$ is Mg, B, Ga, Al, or Zn; $A^1$ is $C_{1-20}$ hydrocarbyl or inertly substituted hydrocarbyl, especially $C_{1-12}$ alkyl or aryl. Preferred inert substituents include halide, trimethylsilyl, haloaryl, and haloalkyl.

The organic protonating reagents used to form polymerization modifiers include compounds of the formula: $[(H-J^1)_{z''} A^2]_{z'''}$, wherein:

$J^1$ is $NA^3$, $PA^3$, S, or O,
z' is 1 or 2,
$A^2$ is $C_{1-20}$ hydrocarbyl or inertly substituted hydrocarbyl, tri($C_{1-10}$hydrocarbyl)silyl, or a polyvalent derivative thereof,
$A^3$ is hydrogen, $C_{1-20}$ hydrocarbyl or inertly substituted hydrocarbyl, or a covalent bond (when $A^2$ is a divalent ligand group and z' is one); and
z''' is a number from 1 to 10.

Preferred organic protonating reagents include compounds of the formula: $(H-J^1)_{z''} A^2$, wherein $J^1$ is $NA^3$, $PA^3$, S, or O, and z" is 1 or 2; and $A^2$ is $C_{1-20}$ hydrocarbyl or inertly substituted hydrocarbyl, tri($C_{1-4}$hydrocarbyl)silyl, or a divalent derivative thereof, especially $C_{1-12}$ alkyl, 1,4-butylene, tri ($C_{1-4}$alkyl)silyl, or aryl, and $A^3$ is hydrogen, $C_{1-20}$ hydrocarbyl or inertly substituted hydrocarbyl, or a covalent bond. Preferred inert substituents are halide, trimethylsilyl, haloaryl, or haloalkyl.

By using a polymerization modifier, one or more process or product properties is beneficially affected. Examples include the ability to prepare copolymers having higher or lower comonomer incorporation at equivalent polymerization conditions or alternatively, preparing equivalent copolymers at higher polymerization temperatures or lower comonomer concentrations in the reaction mixture. Another beneficial feature of the use of a polymerization modifier may be greater selectivity in product formation as determined by narrower or broader molecular weight distribution (Mw/Mn) of homopolymers and copolymer products or a relative lack of formation or reduction in formation of a particular species, such as a polymer fraction having differentiated crystallinity, solubility, tacticity, melting point, melt flow index, or other physical property. A further desirable result of the use of a PM may be improved process properties such as improved monomer conversion efficiency by scavenging impurities that may be present in a polymerization mixture.

In addition to the polymerization modifier, conventional additives may also be employed in the reaction mixture to obtain one or more beneficial results including those recited for the foregoing PM compositions. For example, a scavenger may be employed to remove detrimental impurities, if any, present in the reaction mixture. An example of a suitable scavenger is an alumoxane compound, employed in an amount that is insufficient to result in activation or full activation of the metal complex. Especially preferred alumoxanes include triisopropylaluminum modified methylalumoxane or triisobutylaluminum modified methylalumoxane available commercially under the trade designation MMAO-IP and MMAO-3A from Akzo Noble Corporation. Typically the molar quantity of such scavenger employed ranges from 1 to 10 moles based on metal (aluminum) value per mole of metal complex.

The method of preparation for the polymers of the invention depends upon several factors. An important factor is the temperature used for the polymerization. Temperature is important because it has a significant effect on the molecular weight of the resulting polymers. Generally, the use of lower polymerization temperatures results in polymers having higher molecular weights. For the present invention, temperatures in the range from 70° C. to 150° C. are preferred. More preferably, the temperature ranges from 90° C. to 135° C.

The pressure of the reaction depends upon the selected process but generally varies from atmospheric to 10 MPa, preferably to 500 kPa to 4 MPa. Because the monomers employed may not have large partial pressures at the temperature of operation, an inert substance such as nitrogen, argon, butane, or hexane may be added to the reactor to increase the working pressure of the reactor. Reaction times in a batch polymerization or residence times in a continuous polymerization can vary from 1 minute to 10 hours, more preferably 5 minutes to 6 hours, and most typically from 15 minutes to 60 minutes.

Polymerization Process

Suitable addition polymerization conditions for use herein include solution, gas phase, slurry phase, high pressure, or combinations thereof. Particularly preferred is a solution or slurry phase polymerization of 4-methyl-1-pentene, optionally in combination with one or more comonomers of from 2 to 20 carbon atoms. Suitable copolymerizable comonomers include, ethylene, propylene, butene-1, pentene-1, hexene-1, octene-1, styrene, decene-1, norbornene, norboradiene, ethylidene norbornene, isoprene, dicyclopentadiene, isobutylene, vinylbenzocyclobutane, and cyclopentene.

Typically, in a gas fluidized bed process for producing polymers, a gaseous stream containing one or more monomers is continuously cycled through a fluidized bed in the presence of a catalyst under reactive conditions. The gaseous stream is withdrawn from the fluidized bed, cooled, and recycled back into the reactor. Simultaneously, polymer product is withdrawn from the reactor and fresh monomer is added to replace the polymerized monomer. Examples of such processes are disclosed in U.S. Pat. Nos. 4,543,399, 4,588,790, 5,028,670, 5,317,036, 5,352,749, 5,405,922, 5,436,304, 5,453,471, 5,462,999, 5,616,661 and 5,668,228.

The reactor pressure in a gas phase process may vary from 100 psig (700 kPa) to 500 psig (3500 kPa), preferably in the range of from 200 psig (1400 kPa) to 400 psig (2800 kPa), more preferably in the range of from 250 psig (1700 kPa) to 350 psig (2400 kPa). The reactor temperature in the gas phase process may vary from 30 to 120° C., preferably from 60 to 115° C., more preferably from 70 to 110° C., and most preferably from 70 to 95° C.

A slurry polymerization process generally uses pressures in the range of from 100 kPa to 5 MPa, and temperatures in the range of 0 to 120° C. In a slurry polymerization, a suspension of solid, particulate polymer is formed in a liquid polymerization diluent to which monomers and often hydrogen along with catalyst are added. The diluent is intermittently or continuously removed from the reactor where the volatile components are separated from the polymer and recycled to the reactor. The liquid diluent employed should remain a liquid under the conditions of polymerization and be relatively inert. Preferred diluents are aliphatic or cycloaliphatic hydrocarbons, preferably propane, n-butane, isobutane, pentane, isopentane, hexane, cyclohexane, or a mixture thereof is employed. Examples of suitable slurry polymerization processes for use herein are disclosed in U.S. Pat. Nos. 3,248,179 and 4,613,484.

Solution polymerizations may operate in batch or continuous mode, with continuous mode being preferred for commercial implementation. In the process, polymer remains dissolved in a liquid reaction mixture comprising monomer and optionally solvent. Additional monomer is added in a continuous or semicontinuous manner and product is removed continuously or intermittently and devolatilized to remove unreacted monomer and inert diluent. Examples of solution processes that are suitably employed with the catalyst compositions of the present invention are described in U.S. Pat. Nos. 4,271,060, 5,001,205, 5,236,998 and 5,589,555.

Two reactors of the foregoing types may be operated in series or parallel mode to provide polymer products or blends having a variety of properties. The two reactors may be of different type, such as a solution polymerization reactor followed by a gas phase polymerization in which the discharge from the first reactor is fed directly into the second reactor. Either reactor or both may by used to incorporate 4-methyl-1-pentene into the resulting polymer, alone or in combination with one or more comonomers.

The polymers, typically have a density in the range of from 0.80 g/cc to 0.98 g/cc, preferably in the range of from 0.81 g/cc to 0.90 g/cc. The polymers produced by the process of the invention typically have a molecular weight distribution, a weight average molecular weight to number average molecular weight (Mw/Mn) from 1.5 to 10, particularly from 2 to 5. Multiple reactors typically are employed to produce broader molecular weight distribution products, especially those having a multimodal, especially a bimodal, molecular weight distribution.

The polymers produced by the process of the invention can be used in a wide variety of products and end-use applications especially in the formation of high temperature resistant products that are readily graftable or functionalized. Functionalization of the polymers of the invention may be accomplished by reaction of the ethylenic functionality according to known techniques. As an example, hydroformylation or reaction with carbon monoxide and hydrogen using a noble metal catalyst such as rhodium dicarbonyl acetylacetonate complex can be used to form alcohol or aldehyde functionality. Further derivatives may be prepared by techniques of aminomethylation, alkoxycarbonylation, or hydroxycarbonylation reactions. Other functionalizing reactions include grafting with ethylenically substituted reagents or precursors thereof such as maleic acid, fumaric acid, or maleic anhydride.

An especially desirable functionalization is amination, especially aminomethylation by reaction of ammonia or an amine, especially a secondary amine, with the formyl functionalized reaction product resulting from hydroformylation of the olefin terminated polymer (employing for example a rhodium catalyst such as rhodium dicarbonyl acetonylacetate ($Rh(CO)_2(AcAc)$), a phosphite ligand such as tris(2,4-ditbutylphenyl)phosphite, a $CO/H_2$ mixture, and elevated pressures and temperatures). In a preferred embodiment aminomethylation of the olefin functionality may be achieved in a single step reaction by contacting the olefin containing polymer with the aminomethylating agent (ammonia or a primary or secondary amine compound), a rhodium complex, a phosphine or phosphite ligand, and syngas under elevated temperature and pressure. Preferred rhodium complexes include $Rh(CO)_2(AcAc)$, $Rh_4(CO)_{12}$, $Rh_2(OC(O)CH_3)_4$, $Rh(C_2H_4)_2$(AcAc), Rh(cyclooctadiene)(AcAc), $Rh(norbornene)_2$(AcAc), and Rh(norbornadiene)(AcAc). Preferred phosphine ligands include 2,2'-bis(diphenylphosphino-methyl)-1,1'-binaphthyl, 2,2'-bis[di(3,5-trifluoromethylphenyl)(phosphinomethyl)]-1,1'-binaphthyl, and 9,9-dimethyl-4,5-bis(diphenylphosphino)xanthene. Preferred phosphite ligands include 2,2'-bis-[(3,3',5,5'-tetra-t-butyldiphenyl)(2,2'-diphenyl) phosphite],], tris(2,4-di-t-butylphenyl)phosphite, and other ligands disclosed in U.S. Pat. No. 4,748,261.

The following embodiments of the invention are provided as specific enablement for the appended claims. Accordingly, the present invention provides:

1. An olefin polymer having greater than 85 percent chain end unsaturation, where greater than 70 percent of said unsaturation comprises 1,2-disubstituted olefinic unsaturation.

2. An olefin polymer according to embodiment 1 having Tm greater than 170° C.

3. An olefin polymer according to embodiment 1 having a Tg greater than 30° C.

4. An olefin polymer according to embodiment 3 having a Tg greater than 150° C.

5. An olefin polymer according to embodiment 1 comprising 4-methyl-1-pentene in polymerized form.

6. An olefin polymer according to embodiment 1 consisting essentially of 4-methyl-1-pentene in polymerized form.

7. An olefin polymer according to embodiment 6 which is highly isotactic.

8. An olefin polymer comprising 4-methyl-1-pentene in polymerized form having greater than 90 percent of the polymer chains ending in 1,2-disubstituted olefinic unsaturation.

9. An olefin polymer according to embodiment 8 having Tm greater than 170° C.

10. An olefin polymer according to embodiment 8 having a Tg greater than 30° C.

11. An olefin polymer according to embodiment 10 having a Tg greater than 150° C.

12. An olefin polymer according to embodiment 8 having greater than 95 percent chain end unsaturation.

13. An olefin polymer according to embodiment 8 consisting essentially of 4-methyl-1-pentene in polymerized form.

14. An olefin polymer according to embodiment 13 which is highly isotactic.

15. A functionalized derivative of an olefin polymer formed by reaction of at least some of the terminal ethylenic unsaturation of any of any of the olefin polymers of embodiments 1-14 with at least one additional compound that is reactive with said ethylenic unsaturation.

16. A functionalized derivative of an olefin polymer according to embodiment 15 wherein the additional compound is an unsaturated compound.

17. A functionalized derivative of an olefin polymer according to embodiment 15 formed by reaction of a mixture of hydrogen and carbon monoxide under hydroformylation conditions or with hydrogen, carbon monoxide, and ammonia or an amine under hydroformylation and aminomethylation reaction conditions.

18. A functionalized derivative according to embodiment 15 comprising terminal hydroxyl or amine functionality.

19. A process for forming a functionalized derivative of an olefin polymer according to embodiment 15, said process comprising contacting an olefin polymer according to any one of embodiments 1-14 with at least one additional compound the is reactive with 1,2-disubstituted olefinic unsaturation under conditions to cause at least some of said unsaturation to react.

20. A fabricated product or article in solid form comprising an olefin polymer or functionalized derivative thereof according to any one of embodiments 1-18 or prepared according to embodiment 19.

EXAMPLES

It is understood that the present invention is operable in the absence of any component which has not been specifically disclosed. The following examples are provided in order to further illustrate the invention and are not to be construed as limiting. Unless stated to the contrary, all parts and percentages are expressed on a weight basis. The term "overnight", if used, refers to a time of approximately 16-18 hours, "room temperature", if used, refers to a temperature of 20-25° C., and "mixed alkanes" refers to a mixture of hydrogenated propylene oligomers, mostly $C_6$-$C_{12}$ isoalkanes, available commercially under the trademark Isopar E™ from Exxon-Mobil Chemicals, Inc.

Examples 1-4

Figure 5:
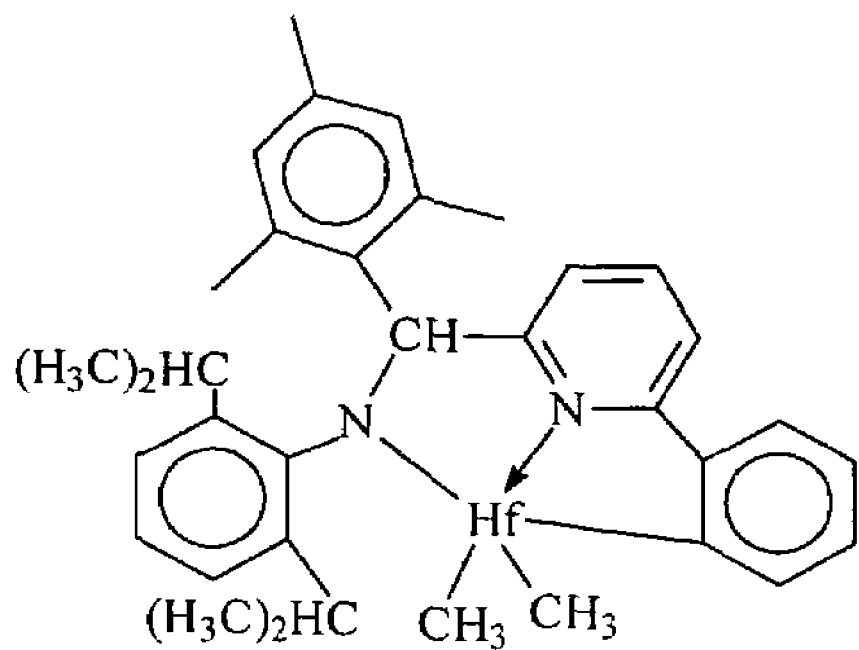
FIG. 5 is the structure of CAT1 employed in the example.
Figure 6:
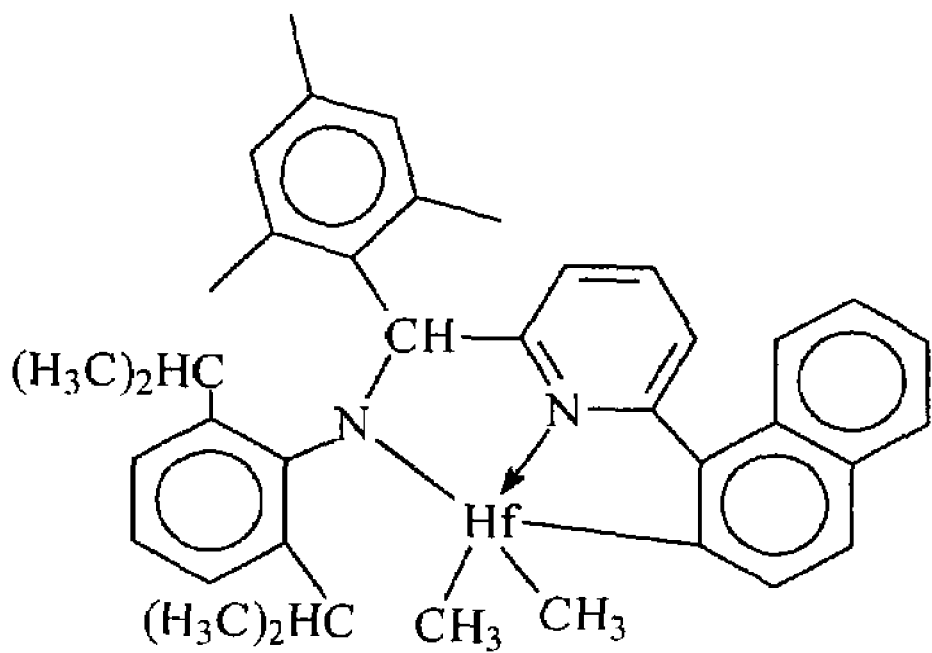
FIG. 6 is the structure of CAT2 employed in the example.

A 3.8 L glass lined autoclave is conditioned at high temperature under $N_2$ purge. Mixed alkanes (1300 g) are added, and the reactor is heated to the desired temperature. 4-Methyl-1-pentene (580 g, 6.89 mol) is added batchwise to the reactor and not further regulated during the run. Toluene solutions of catalyst, cocatalyst, and polymerization modifier (PM) are mixed and then added to the reactor using a flush of high pressure mixed alkanes. The catalysts employed are [N-(2,6-di(1-methylethyl)phenyl)amido)(2,4,6-trimethylphenyl)(phenylen-2-diyl)(6-pyridin-2-diyl)methane)] hafnium dimethyl (CAT1) (for structure, see FIG. 5) and [N-(2,6-di(1-methylethyl)phenyl)amido)(2,4,6-trimethylphenyl)(α-naphthalen-2-diyl)(6-pyridin-2-diyl)methane)] hafnium dimethyl (CAT2) (for structure see FIG. 6) both prepared substantially according to the teachings of 2003US0204017, published Oct. 30, 2003 and U.S. Ser. No. 10/429024, filed May 2, 2003 now U.S. Pat. No. 6,953, 764. The amount of catalyst employed is 6.0 μmole. The cocatalyst employed is a mixture of long chain alkyl ammonium salts of tetrakispentafluorophenylborate, primarily dimethyloctadecylammonium tetrakis(pentafluorophenyl)borate. The amount of cocatalyst employed is 6.6 μmole. The polymerization modifiers (PM) used are trialkylaluminum modified methylalumoxanes, MMAO-12 (MMAO) and PMAO-IP (PMAO), both available from Akzo Noble Company. After 15 minutes reaction time, the reactor contents are dumped into a resin kettle where they are mixed with 1 g of a 50/50 mixture of an antioxidant (Irganox™ 1010 available from Ciba Geigy Corp.) and a stabilizer (Irgafos™ 168 available from Ciba Geigy Corp.). The polymer is recovered by evaporating the majority of the solvent under ambient conditions and then drying further in a vacuum oven overnight at 90° C. Polymerization results are summarized in Table 1.

TABLE 1

| Ex. | Catalyst | PM | PM (mmol) | Temp. (° C.) | Yield (g) | Eff. (gPP/mgHf) |
|---|---|---|---|---|---|---|
| 1 | CAT1 | MMAO | 3.0 | 90 | 27 | 25 |
| 2 | " | PMAO | 0.2 | 100 | 51 | 48 |
| 3 | CAT2 | MMAO | 3.0 | 90 | 43 | 40 |
| 4 | " | MMAO | 3.0 | 110 | 46 | 43 |

Polymer Characterization Data

GPC and DSC characterization data of the resulting homopolymers are summarized in Table 2. The high crystalline melting point confirms that the polymer is a highly crystalline, stereoregular, highly isotactic p-4MP1.

TABLE 2

| Run | $M_n$ (g/mol) | $M_w$ (g/mol) | $M_w/M_n$ | $T_m$ (° C.) |
|---|---|---|---|---|
| 1 | 9320 | 25000 | 2.68 | 226 |
| 2 | 11200 | 42600 | 3.80 | 228 |
| 3 | 15900 | 66400 | 4.18 | 232 |
| 4 | 10000 | 22500 | 2.25 | 228 |

Polymer End Group analysis by $^1$H NMR

In an inert atmosphere glove box under nitrogen, 0.10 g of polymer is mixed with 2.5 mL of a 50:50 (wt) mixture of tetrachloroethylene and d2-1,2-tetrachloroethane. The sample is alternately heated at 110° C. and agitated until a homogeneous solution is obtained (10 minutes mixing time).

The 1H NMR spectrum is recorded in a Bruker AV400™ spectrometer with a 10 mm probe heated at 110° C. Between 200-400 scans are collected with a 5 second relaxation delay. Peaks are referenced to the residual proton signals for the d2-1,2-tetrachloroethane solvent. A comparative p-4MP1 homopolymer is prepared by use of a metallocene catalyst (dimethylsilanebis(2-methyl-4-phenylindenyl)zirconium (II) 1,4-diphenylbutadiene) (prepared substantially according to the teachings of U.S. Pat. No. 5,616,664) substantially according to the polymerization conditions of Examples 1-4, but in the presence of hydrogen chain transfer agent. (Without use of hydrogen no polymerization occurs).

Figure 2:
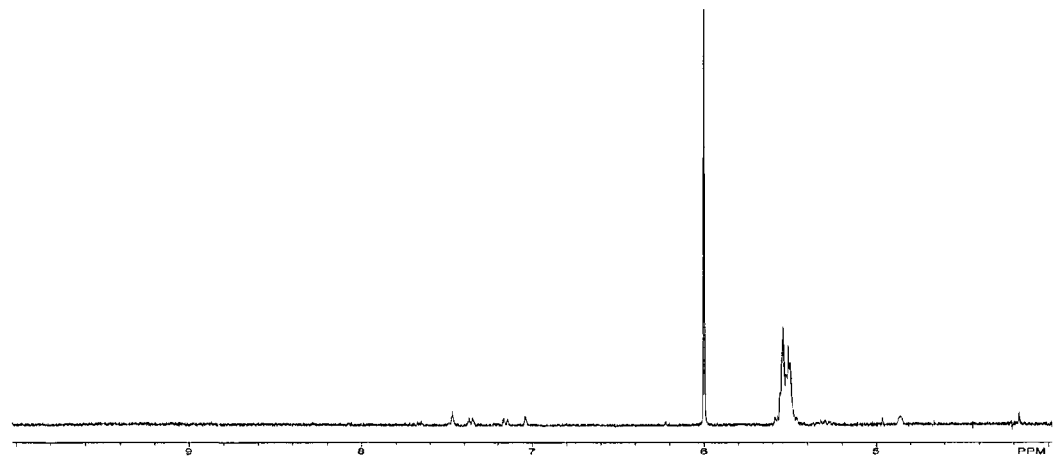
FIG. 2 is the $^1$H NMR spectrum of a p-4MP1 composition according to the invention.
Figure 3:
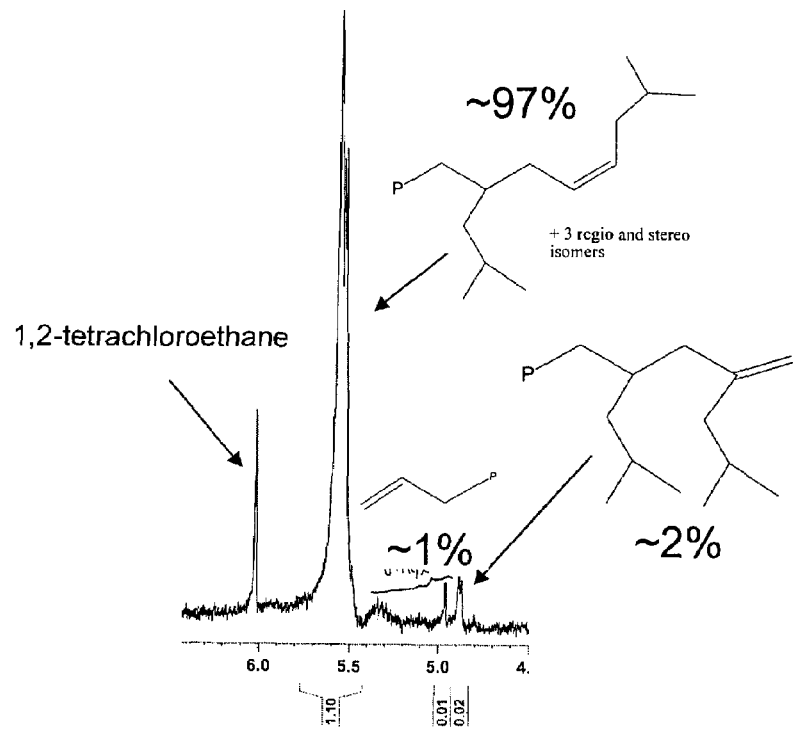
FIG. 3 is the expanded end group region of the $^1$H NMR spectrum of FIG. 2.

Results of the comparative polymer analysis are contained in FIG. 1. Results of the analysis of the polymer of Example 2 are contained in FIG. 2. The region between 4.5-6.0 ppm of the spectrum of FIG. 2 is expanded in FIG. 3, and the end group assignments are made according to Resconi et. Al., J. Am. Chem. Soc, (1998), 120, 2315.

Polymer Functionalization And End Group Analysis

A sample of the polymer of Example 2 is hydroformylated by reaction with syngas (a mixture of carbon monoxide and hydrogen) under the following conditions. A solution of rhodium dicarbonyl acetylacetonate (10.2 mg) and tris(2,4-di-t-butylphenyl)phosphite (48.2 mg) in dehydrated and deoxygenated toluene (25 mL) is prepared under inert atmosphere. A sample of the polymer (1.02 g) and 5 mL of the solution are charged to a glass reactor. The reactor contents are purged with nitrogen, pressurized to 85 psig (690 kPa) with a 1:1 molar H2/CO mixture, heated to 100° C., further pressurized to 300 psig (2.2 MPa) with the H2/CO mixture and maintained at that temperature and pressure for 4 hours. At this time the reactor is cooled, disassembled and the liner removed to yield a slightly yellow slurry. Anhydrous methanol (5 mL) is charged to further precipitate the polymer. The precipitate is filtered, washed with acetone to remove any residual catalyst, and dried in a vacuum oven at 80° C. overnight to yield 0.87 g of a white polymer.

Figure 4:
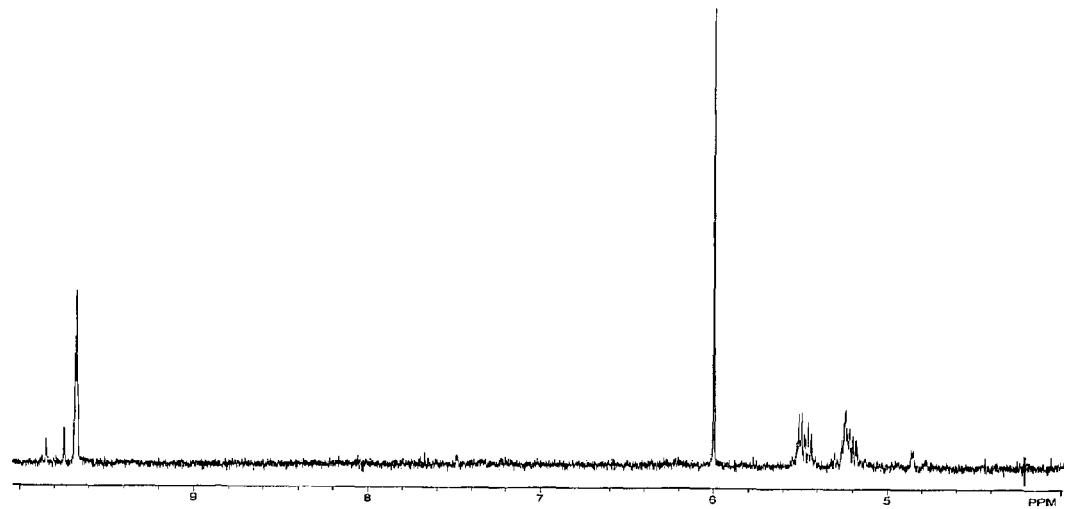
FIG. 4 is the $^1$H NMR spectrum of a functionalized p-4MP1 composition according to the invention.

The $^1$H NMR spectrum of this polymer measured at 110° C. in 50:50 tetrachloroethylene and methylene chloride-d2, shows the presence of carbonyl functional groups in place of ethylenic unsaturation, thereby verifying conversion of at least some of the ethylenic end groups in the polymer. Results are contained in FIG. 4.

The invention claimed is:

1. An olefin polymer having greater than 85 percent chain end unsaturation, where greater than 70 percent of said unsaturation comprises 1,2-disubstituted olefinic unsaturation; and, wherein the olefin polymer is highly isotactic.

2. An olefin polymer according to claim 1 having Tm greater than 170° C.

3. An olefin polymer according to claim 1 having a Tg greater than 30° C.

4. An olefin polymer according to claim 3 having a Tg greater than 150° C.

5. An olefin polymer according to claim 1 comprising 4-methyl-1-pentene in polymerized form.

6. An olefin polymer having greater than 85 percent chain end unsaturation, wherein greater than 70 percent of said unsaturation comprises 1,2-disubstituted olefinic unsaturation, consisting essentially of 4-methyl-1-pentene in polymerized form.

7. An olefin polymer according to claim 6 which is highly isotactic.

8. An olefin polymer comprising 4-methyl-1-pentene in polymerized form having greater than 90 percent of the polymer chains ending in 1,2-disubstituted olefinic unsaturation and wherein said polymer is highly isotactic.

9. An olefin polymer according to claim 8 having Tm greater than 170° C.

10. An olefin polymer according to claim 8 having a Tg greater than 30° C.

11. An olefin polymer according to claim 10 having a Tg greater than 150° C.

12. An olefin polymer according to claim 8 having greater than 95 percent chain end unsaturation.

13. An olefin polymer according to claim 8 consisting essentially of 4-methyl-1-pentene in polymerized form.

14. A functionalized derivative of an olefin polymer formed by a process comprising:
  reacting an olefin polymer having greater than 85 percent chain end unsaturation, where greater than 70 percent of said unsaturation comprises 1,2-disubstituted olefinic unsaturation; and, wherein said polymer is highly isotactic
  with at least one additional compound that is reactive with said ethylenic unsaturation.

15. A functionalized derivative of an olefin polymer according to claim 14 wherein the additional compound is an unsaturated compound.

16. A functionalized derivative of an olefin polymer according to claim 14 formed by reaction of a mixture of hydrogen and carbon monoxide under hydroformylation conditions or with hydrogen, carbon monoxide, and ammonia or an amine under hydroformylation and aminomethylation reaction conditions.

17. A functionalized derivative according to claim 14 comprising terminal hydroxyl or amine functionality.

18. A process for forming a functionalized derivative of an olefin polymer, said process comprising:
  contacting an olefin polymer having greater than 85 percent chain end unsaturation, wherein greater than 70 percent of said unsaturation comprises 1,2-disubstituted olefinic unsaturation; and, wherein said polymer is highly isotactic with at least one additional compound that is reactive with the 1,2-disubstituted olefinic unsaturation under conditions to cause at least some of said unsaturation to react.

19. A fabricated product or article in solid form comprising an olefin polymer according to claim 1.

20. A fabricated product or article in solid form comprising an olefin polymer according to claim 6.

21. A fabricated product or article in solid form comprising an olefin polymer according to claim 8.

22. A fabricated product or article in solid form comprising a functionalized derivative of an olefin polymer according to claim 14.

23. The functionalized derivative of the olefin polymer of claim 15 wherein the olefin polymer consists essentially of 4-methyl-1-pentene in polymerized form.

24. The functionalized derivative of the olefin polymer of claim 23 wherein the olefin polymer has greater than 90 percent of the polymer chains ending in 1,2-disubstituted olefinic unsaturation.

25. The process of claim 18 wherein the olefin polymer consists essentially of 4-methyl-1-pentene in polymerized form.

26. The process of claim 25 wherein the olefin polymer has greater than 90 percent of the polymer chains ending in 1,2-disubstituted olefinic unsaturation.

27. An olefin polymer having greater than 85 percent chain end unsaturation, wherein greater than 70 percent of said unsaturation comprises 1,2-disubstituted olefinic unsaturation; and, a Tm greater than 170° C.

* * * * *

UNITED STATES PATENT AND TRADEMARK OFFICE
CERTIFICATE OF CORRECTION

| | | |
|---|---|---|
| PATENT NO. | : 7,524,913 B2 | Page 1 of 1 |
| APPLICATION NO. | : 11/632372 | |
| DATED | : April 28, 2009 | |
| INVENTOR(S) | : John R. Briggs et al. | |

It is certified that error appears in the above-identified patent and that said Letters Patent is hereby corrected as shown below:

Title Page; item (73);

The corrected record should reflect Assignee name as:

Dow Global Technologies Inc.

The error appears to be a clerical error on the part of the USPTO and not the Applicant. All documents submitted by the Applicant contain the correct spelling of the Assignee.

Signed and Sealed this

Twenty-sixth Day of May, 2009

JOHN DOLL
*Acting Director of the United States Patent and Trademark Office*